(12) United States Patent
Jorgensen et al.

(10) Patent No.: US 9,857,608 B2
(45) Date of Patent: Jan. 2, 2018

(54) POINT-OF-USE-ACTIVATED MICROBATTERY AND BIOCOMPATIBLE ELECTRONIC DEVICE INCORPORATING THE SAME

(71) Applicant: Quantum Medical Innovations, LLC, Jacksonville, FL (US)

(72) Inventors: Glen Jorgensen, Jacksonville, FL (US); Steve Reeser, Jacksonville, FL (US)

(73) Assignee: Quantum Medical Innovations LLC, Jacksonville, FL (US)

( * ) Notice: Subject to any disclaimer, the term of this patent is extended or adjusted under 35 U.S.C. 154(b) by 99 days.

(21) Appl. No.: 15/076,153

(22) Filed: Mar. 21, 2016

(65) Prior Publication Data

US 2016/0276678 A1   Sep. 22, 2016

Related U.S. Application Data

(60) Provisional application No. 62/135,756, filed on Mar. 20, 2015.

(51) Int. Cl.
| | |
|---|---|
| *G02C 7/00* | (2006.01) |
| *G02C 7/08* | (2006.01) |
| *H01M 6/32* | (2006.01) |
| *H01M 6/40* | (2006.01) |
| *G02C 7/04* | (2006.01) |

(52) U.S. Cl.
CPC ............ *G02C 7/083* (2013.01); *G02C 7/04* (2013.01); *H01M 6/32* (2013.01); *H01M 6/40* (2013.01); *H01M 2220/30* (2013.01)

(58) Field of Classification Search
CPC ........... G02C 7/04; G02C 7/083; H01M 6/32; H01M 6/40; H01M 2220/30

USPC ............................................. 351/159.03, 519
See application file for complete search history.

(56) References Cited

U.S. PATENT DOCUMENTS

2016/0056417 A1\* 2/2016 Flitsch ............. B29D 11/00817
429/185

OTHER PUBLICATIONS

Demosthenous, A., Advances in Microelectronics for Implantable Medical Devices, Advances in Electronics, Apr. 29, 2014, vol. 2014, Article ID 981295, p. 1-21.

(Continued)

*Primary Examiner* — Bumsuk Won
*Assistant Examiner* — Collin X Beatty
(74) *Attorney, Agent, or Firm* — Pandiscio & Pandiscio

(57) ABSTRACT

A biocompatible electronic device incorporating a point-of-use-activated microbattery, the biocompatible electronic device comprising: a housing; a sealed control electronics chamber formed within the housing; control electronics contained within the sealed control electronics chamber for controlling the operation of the biocompatible electronic device; a sealed electrode chamber formed within the housing; a plurality of electrodes contained within the sealed electrode chamber and connected to the control electronics; an access port formed within the housing for providing fluid access to the interior of the sealed electrode chamber; and a removable tab for selectively sealing the access port; such that, upon removal of the removable tab, a contacting fluid can contact the electrodes and act as an electrolyte for activating the microbattery, whereby to enable the microbattery to power the control electronics for the biocompatible electronic device.

24 Claims, 10 Drawing Sheets

(56) References Cited

OTHER PUBLICATIONS

Ferber, D., Printing Tiny Batteries, Wyss Institute, Jun. 18, 2013, Harvard School of Engineering and Applied Sciences, https://wyss.harvard.edu/printing-tiny-batteries.
Garay, E.F., Biofluid-activated Microbattery for Disposable Microsystems, Masters Thesis, University of Florida, 2013.
Garay, E.F. et al. , Biofluid Activated Microbattery for Disposable Microsystems, Journal of Microelectromechanical Systems, Feb. 2015, vol. 24, No. 1, p. 70-79.
Pikul, J.H. et al., High-power Lithium Ion Microbatteries from Interdigitated Three-dimensional Bicontinuous Nanoporous Electrodes, Nature Communications, Apr. 16, 2013, vol. 4, p. 1-5.
Sammoura, F. et al., Water-activated disposable and Long Shelf Life Microbatteries, Sensors and Actuators A 111, 2004, p. 79-86.

\* cited by examiner

POINT-OF-USE-ACTIVATED MICROBATTERY AND BIOCOMPATIBLE ELECTRONIC DEVICE INCORPORATING THE SAME

REFERENCE TO PENDING PRIOR PATENT APPLICATION

This patent application claims benefit of pending prior U.S. Provisional Patent Application Ser. No. 62/135,756, filed Mar. 20, 2015 by Quantum Medical Innovations, LLC and Glen Jorgensen et al. for POINT-OF-USE-ACTIVATED MICROBATTERY FOR DISPOSABLE MEDICAL DEVICES, which patent application is hereby incorporated herein by reference.

FIELD OF THE INVENTION

This invention relates to biocompatible electronic devices in general, and more particularly to biocompatible electronic devices incorporating microbatteries for powering the same.

BACKGROUND OF THE INVENTION

Typical examples of applications in which the novel microbattery disclosed herein become an enabling technology include the newest generations of disposable, self-contained, Lab-On-a-Chip (LOC) diagnostic devices and the newest designs for disposable "smart" contact lenses (i.e., contact lenses which can change their optical properties in response to patient-generated stimuli. Although the specific circuitry, chemistry and/or function of these types of devices are proprietary, it can be deduced that some electronic circuitry must be embedded in the device and that an on-board microbattery will power its logic and mechanical function.

These two exemplary applications, although widely different in their market goals and constructions, generally share similar microbattery technology. Specifically, both the anode and the cathode of the microbattery are provided in alternating and interdigitated fashion, as shown in FIG. 1, in order to provide the maximum surface area exposure per unit area of available space within the microbattery. These two exemplary applications also both connect the microbattery to micro-logic electronic circuits ("control electronics") which, in turn, switch logic states to control operation of the device (e.g., to control the operation of sensors, to control the movement of fluids, etc. within the device). And, most importantly to the present invention, these two exemplary applications both require an electrolyte to activate the microbattery in order to provide the necessary electrical power to the control electronics.

However, there is a subtle, but important, differentiation between these two exemplary applications. More particularly, in the case of the LOC, the electrolyte for the microbattery may be a body fluid ("biofluid") that contains some level of a specific marker that also affects the reactivity of the biofluid (i.e., the performance of the biofluid) as the electrolyte for the microbattery. Note that the function of the LOC is to analyze the body fluid by monitoring for this change. This body fluid is, therefore, commonly referred to as the analyte in the case of the LOC. By way of example but not limitation, it is believed that glucose in the blood decreases the efficiency of the blood to act as an electrolyte. So if a drop of blood from a patient with high glucose levels is placed into the microbattery as the activating electrolyte, the power generated by the microbattery is lower than the output from a microbattery where the drop of reference blood electrolyte is low in glucose. Thus, by observing the power generated by the microbattery, the LOC device is able to analyze the glucose marker in the blood (the analyte). So in such an LOC device, the analyte (i.e., the blood) is also the electrolyte for the microbattery.

In the case of the "smart" contact lens, it is possible to vary the optical characteristics (e.g., magnification strength) of a smart contact lens where the smart contact lens is a composite of two or more lenses that define an optical cavity, and where the optical cavity contains an activatable material (e.g., a liquid crystal) which is capable of assuming at least two different optical states, and where the optical state of the activatable material is a function of a voltage applied across the activatable material. Thus, by changing the voltage applied across the activatable material, the optical properties (e.g., magnification strength) of the smart contact lens can be varied. The voltage source for the smart contact lens is an on-board microbattery consisting of an anode and a cathode made from biocompatible materials and an electrolyte (e.g., a biofluid, saline, etc.). In the case of the smart contact lens, the electrolyte is not an analyte per se (since it is not being tested for the presence of a target), but rather is a fluid (e.g., a biofluid, saline, etc.) which is recruited solely for the purpose of serving as the electrolyte activator of the microbattery.

The micro-electronic circuits ("control electronics") used in biocompatible electronic devices (e.g., LOC's, smart contact lenses, etc.) are typically a collection of thin-film resistors, ceramic micro-capacitors, semiconductors, and thin-film conductors. The power requirements of the biocompatible electronic device (e.g., an LOC or smart contact lens) can be assumed be typical of the current power requirements of a medical implant such as a cochlear implant, which is 30 $\mu W/mm^2$ from a 1 mm thick film or a Power Density Factor of 3 $\mu W\ cm^{-2}\ \mu m^{-1}$ (see Advances in Electronics Vol 2014, Article ID 981295, 21 pages "Advances in Microelectronics for Implantable Medical Devices" Andreas Demosthenous). By way of example but not limitation, for the lower demand requirements of the smart contact lens application, it is estimated that the power density factor for a demand of 3 $\mu A$ at a minimum of 1.5 V from a microbattery having an area of approximately 0.1 $cm^2$ and having a maximum stacked film thickness of about 45 $\mu m$ yields a Power Density Factor of 1 $\mu W\ cm^{-2}\ \mu m^{-1}$. If the wear time of the smart contact lens is presumed to be 18 hours with a 25% duty cycle, the Energy Density Factor is 4.5 $\mu Whr\ cm^{-2}\ \mu m^{\mu 1}$.

The plot shown in FIG. 2 illustrates the power density-energy density relationship of a number of commercial devices, including four commercial microbatteries (see J. H Pikul, H. G. Zhang, J. Cho, P. V. Braun, and W. P. King, "High-power lithium ion microbatteries from interdigitated three-dimensional bicontinuous nanoporous electrodes,"Nature Communications, vol 4, April 2013). The specifications shown in FIG. 2 indicate that the four commercial microbatteries shown in FIG. 2 are poor candidates for a smart contact lens application. Furthermore, the contents of these four commercial microbatteries are not biocompatible, and even the best packaging for these four commercial microbatteries is subject to dangerous failures from the flammable components which are contained under pressure.

Research into "biocompatible" microbatteries shows that, although their biocompatible components make them safer for use in the body, they tend to suffer from a performance output which is 10-20 times lower than the four commercial microbatteries shown in FIG. 2 (see E.F. Garay, "Biofluid-activated microbattery for disposable microsystems" Masters Thesis, University of Florida. 2013). For example, data from a biocompatible microbattery having aluminum-silver oxide (Al—AgO) electrodes and using a biofluid (human tear drops) as the electrolyte are shown in the table below. However, the test load on the biocompatible Al—AgO microbattery was 3 times higher, the active film of the biocompatible Al—AgO microbattery was ineffectively thin, and the duty cycle was a continuous drain on the microbattery—all factors that yield lower performance than could be made possible with improvements in material choices, battery thickness, and switching improvements between duty cycles.

| Anode-cathode | electrolyte | Power Density $\mu W\ cm^{-2}\ \mu m^{-1}$ | Energy Density $\mu W\ h\ cm^{-2}\ \mu m^{-1}$ | Predicted run time |
|---|---|---|---|---|
| Al—AgO | Urine | 35 | 20 | 45 min |
| Al—AgO | Blood | 45 | 13 | 20 min |
| Al—AgO | Saliva | 22 | 12 | 30 min |

Similar performance has been achieved with biocompatible microbatteries using magnesium-silver chloride electrodes or magnesium-copper chloride electrodes that can deliver 18 $\mu Whr\ cm^2\ \mu m^{-1}$ in a microbattery (see Firas Sammoura, Ki Banf Lee, and Liwei Lin "Water-activated disposable and long shelf-life microbatteries" Sensors and Actuators A 111 (2004) 79-86). The article of Firas Sammoura provides a number of important statements about such biocompatible microbatteries employing magnesium-silver chloride electrodes, or magnesium-copper chloride electrodes, and activated by a biofluid (e.g., water). "Before water was added to their anode-cathode reaction chamber, there is no contact between the electrodes and no reaction is expected such that these microbatteries could have a long shelf life. When water is added into the system, surface tension force drives it to fill the reaction chamber. The chemicals dissolve to produce electricity." With a 5× reduction to the test load and a change to the duty cycle from a continuous drain on the battery to, for example, 20% active time, then a 25 hour microbattery could be realized from either the aluminum-silver oxide or magnesium-silver chloride electrodes or magnesium-copper chloride electrodes. But only if the battery's electrode reaction chamber ("electrode chamber") remains dry before the electrolyte (i.e., the biofluid) is introduced into the electrode chamber. It is well known that primary batteries using alkaline-derived electrolytes experience a self-discharge rate of 10% per year of storage. It is less well known, however, that the discharge rate for batteries with less-reactive biocompatible electrodes (e.g., Al—AgO, chloride electrodes or magnesium-copper chloride electrodes) would increase linearly with the decrease in electrochemical reactivity—which could increase the self-discharge rate another 10% per year. In addition, powered electrical circuits typically experience another 20% current leakage loss per year. Thus, nearly half of the battery power is typically lost during just a single year of storage.

In addition to the foregoing, in the case of the smart contact lens, it is the common practice to cover the smart contact lens with a soft hydrogel "comfort" layer and to store the smart contact lens in saline, which would initiate electrode activity and "start the clock" of storage power loss at the time of packaging.

Thus it will be seen that improvements are needed in devices (e.g., LOCs, smart contact lenses, etc.) which must incorporate biocompatible microbatteries therein, wherein the microbatteries are intended to employ biofluids as the activating electrolyte and wherein the devices must have a long shelf life prior to insertion into the body in order to make such devices truly enabling for use in the body.

SUMMARY OF THE INVENTION

The present invention comprises the provision and use of a novel biocompatible electronic device (e.g., an LOC, a smart contact lens, etc.) that is fabricated in a manner that provides a housing having a sealed control electronics chamber for containing control electronics for controlling the operation of the biocompatible electronic device, and a sealed electrode chamber for containing the electrodes of a microbattery for powering the control electronics contained in the sealed control electronics chamber, the electrodes in the sealed electronics chamber being connected to the control electronics in the sealed control electronics chamber, and the sealed electrode chamber having an access port that is sealed by a removable tab, such that upon removal of the removable tab, a contacting fluid (e.g., a biofluid, saline, etc.) can contact the electrodes and act as an electrolyte for activating the microbattery, whereby to enable the microbattery to power the control electronics for the novel biocompatible electronic device.

In view of the foregoing construction, the novel biocompatible electronic device can be stored in an uncontrolled environment for extended periods of time and remain sealed. At the time of use, the removable tab is removed from its position of sealing the access port so as to allow a contacting liquid (e.g., a biofluid, saline, etc.) to enter the sealed electrode chamber, contact the microbattery electrodes and activate the microbattery, whereby to power the control electronics contained in the sealed control electronics chamber.

It will be appreciated that the housing, the sealed electrode chamber, the biocompatible electrodes contained within the sealed electrode chamber, the access port and the removable tab together form a biocompatible microbattery for powering the biocompatible electronic device.

In one preferred embodiment of the invention, the novel biocompatible electronic device is a smart contact lens. In this form of the invention, the smart contact lens is fabricated in a manner that produces a housing having a first sealed chamber (an "optical chamber") that comprises the optic zone which is filled with an activatable material (e.g., a liquid crystal) that can change the optical properties of the activatable material (e.g., causing a change in the diopter of the optic zone) in response to electrical input from a second sealed chamber (i.e., the electrode chamber) containing the electrodes of a microbattery designed to power certain activities in the first sealed chamber (i.e., the optical chamber), the second sealed chamber (i.e., the electrode chamber) having an access port that is sealed by a removable tab, and the smart contact lens is fabricated in a manner that produces a third sealed chamber (e.g., the control electronics chamber) for storage of the control electronics which control the electrical input provided to the activatable material in the optical chamber by the electrodes in the electrode chamber in response to input from the wearer. If desired, a fourth sealed chamber (e.g., a sealed overflow chamber) may also be provided to contain any overflow of the activatable material (e.g., the liquid crystal) from the optical chamber during assembly.

The smart contact lens can be enclosed within a hydrogel layer to improve wearer comfort and can be stored in saline for extended periods of time and remain sealed. At the time of use, the removable tab is removed, unsealing the access port so as to allow a contacting liquid (e.g., from the storage saline or the tear layer of the eye) to wick into the electrode chamber to activate microbattery and thereby power the control electronics of the smart contact lens.

In one preferred form of the present invention, there is provided a biocompatible electronic device incorporating a point-of-use-activated microbattery, the biocompatible electronic device comprising:
  a housing;
  a sealed control electronics chamber formed within the housing;
  control electronics contained within the sealed control electronics chamber for controlling the operation of the biocompatible electronic device;
  a sealed electrode chamber formed within the housing;
  a plurality of electrodes contained within the sealed electrode chamber and connected to the control electronics;
  an access port formed within the housing for providing fluid access to the interior of the sealed electrode chamber; and
  a removable tab for selectively sealing the access port;
  such that, upon removal of the removable tab, a contacting fluid can contact the electrodes and act as an electrolyte for activating the microbattery, whereby to enable the microbattery to power the control electronics for the biocompatible electronic device.

In another preferred form of the present invention, there is provided a method for operating a biocompatible electronic device, the method comprising:
  providing a biocompatible electronic device incorporating a point-of-use-activated microbattery, the biocompatible electronic device comprising:
    a housing;
    a sealed control electronics chamber formed within the housing;
    control electronics contained within the sealed control electronics chamber for controlling the operation of the biocompatible electronic device;
    a sealed electrode chamber formed within the housing;
    a plurality of electrodes contained within the sealed electrode chamber and connected to the control electronics;
    an access port formed within the housing for providing fluid access to the interior of the sealed electrode chamber; and
    a removable tab for selectively sealing the access port;
    such that, upon removal of the removable tab, a contacting fluid can contact the electrodes and act as an electrolyte for activating the microbattery, whereby to enable the microbattery to power the control electronics for the biocompatible electronic device;
  removing the removable tab and exposing the access port to a contacting fluid.

In another preferred form of the present invention, there is provided a point-of-use-activated microbattery, the point-of-use-activated microbattery comprising:
  a housing;
  a sealed electrode chamber formed within the housing;
  a plurality of biocompatible electrodes contained within the sealed electrode chamber;
  an access port formed within the housing for providing fluid access to the interior of the sealed electrode chamber; and
  a removable tab for selectively sealing the access port;
  such that, upon removal of the removable tab, a contacting fluid can contact the biocompatible electrodes and act as an electrolyte for activating the microbattery.

In another preferred form of the present invention, there is provided a method for operating a point-of-use-activated microbattery, the method comprising:
  providing a point-of-use-activated microbattery, the point-of-use-activated microbattery comprising:
    a housing;
    a sealed electrode chamber formed within the housing;
    a plurality of biocompatible electrodes contained within the sealed electrode chamber;
    an access port formed within the housing for providing fluid access to the interior of the sealed electrode chamber; and
    a removable tab for selectively sealing the access port;
    such that, upon removal of the removable tab, a contacting fluid can contact the biocompatible electrodes and act as an electrolyte for activating the microbattery; and
  removing the removable tab and exposing the access port to a contacting fluid, wherein the contacting fluid contacts the biocompatible electrodes and acts as an electrolyte for activating the microbattery.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein.

DETAILED DESCRIPTION OF THE PREFERRED EMBODIMENTS

Figure 1:
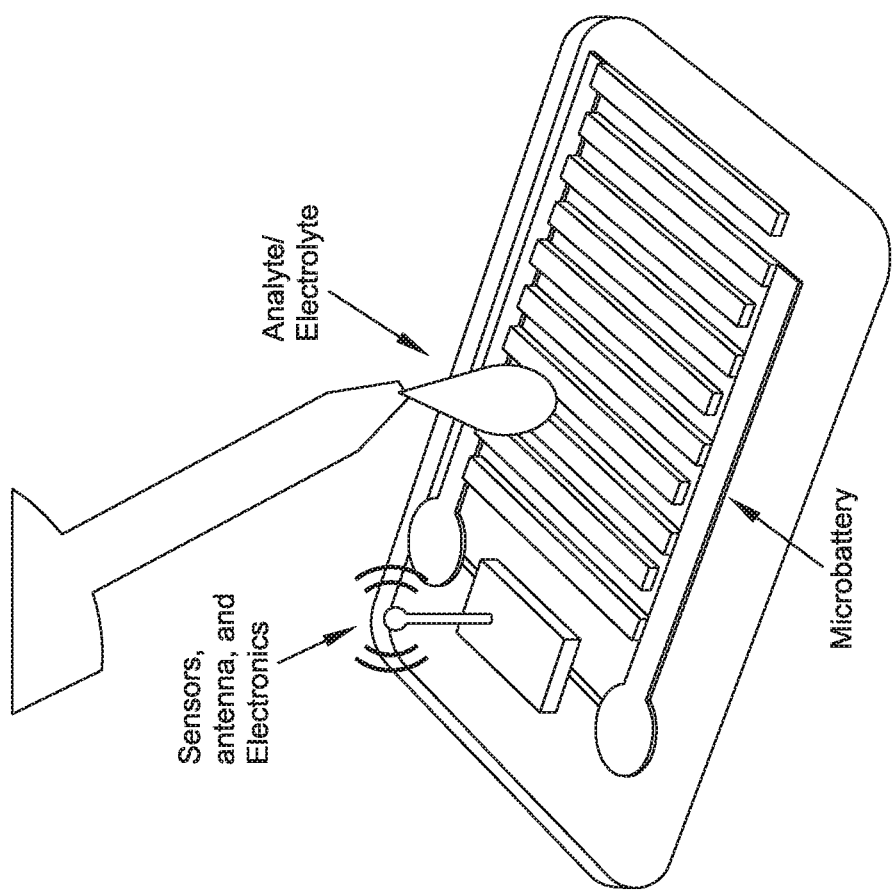
FIG. 1 is a schematic view of a prior art microbattery.
Figure 2:
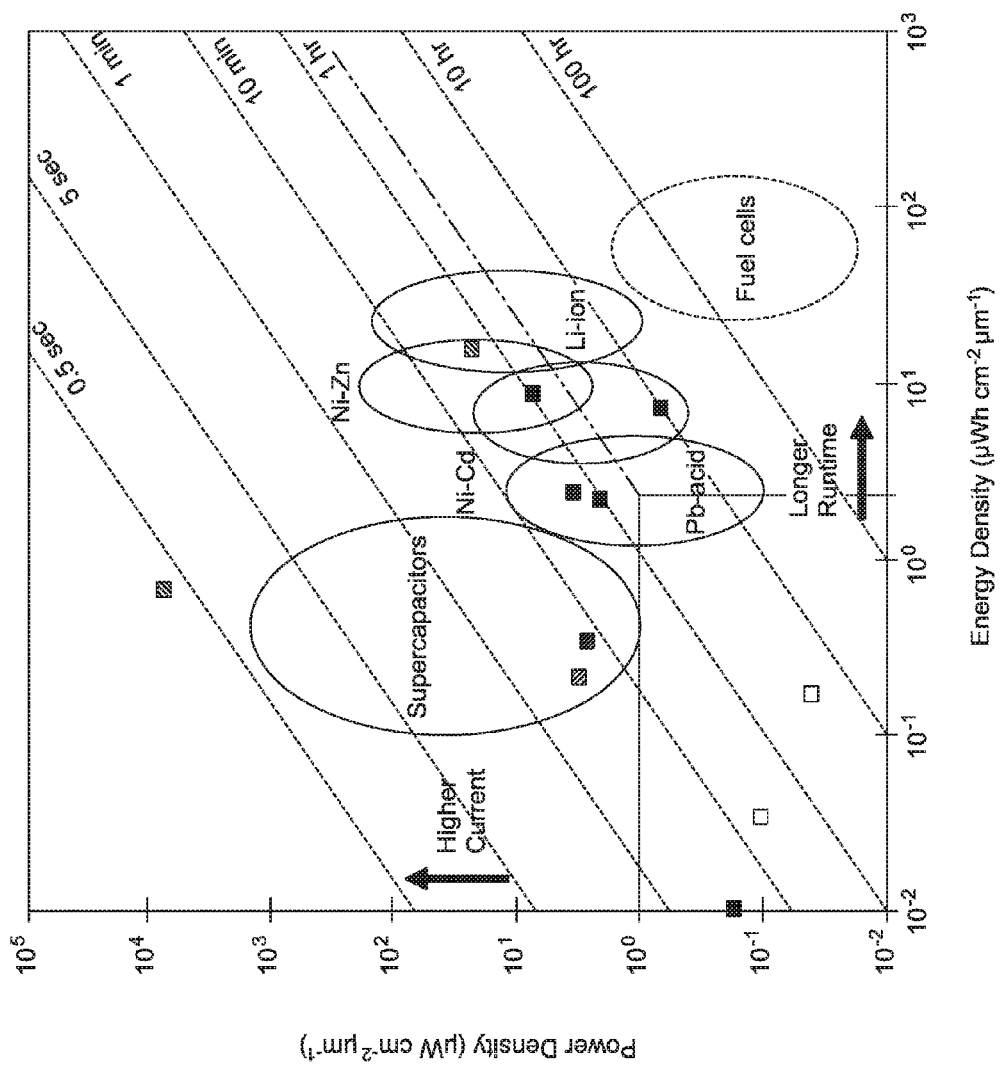
FIG. 2 is a schematic view showing a plot of power density versus energy density for a variety of prior art devices.
Figure 2A:
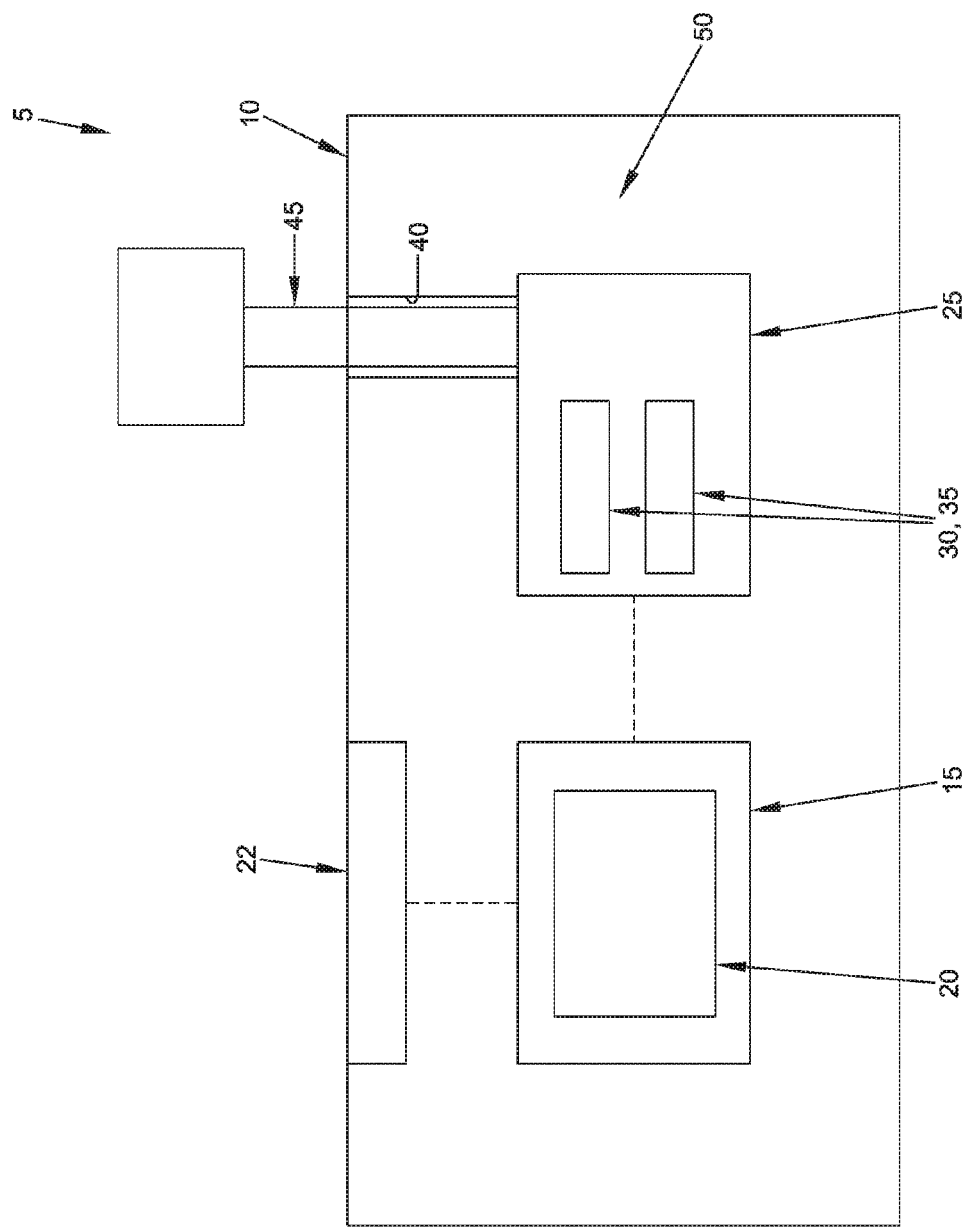
FIG. 2A is a schematic view showing a novel biocompatible electronic device formed in accordance with the present invention.
Figure 3:
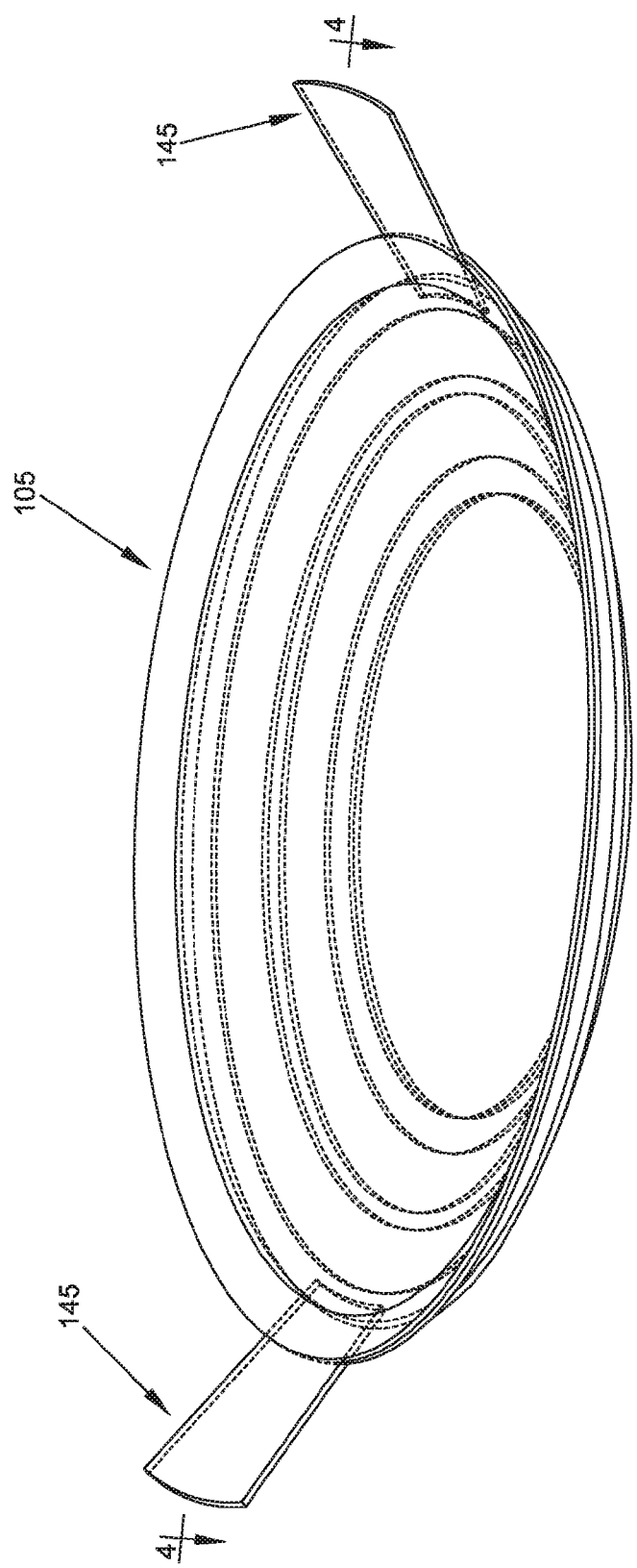
FIG. 3 is a schematic view of a smart contact lens formed in accordance with the present invention.
Figure 4:
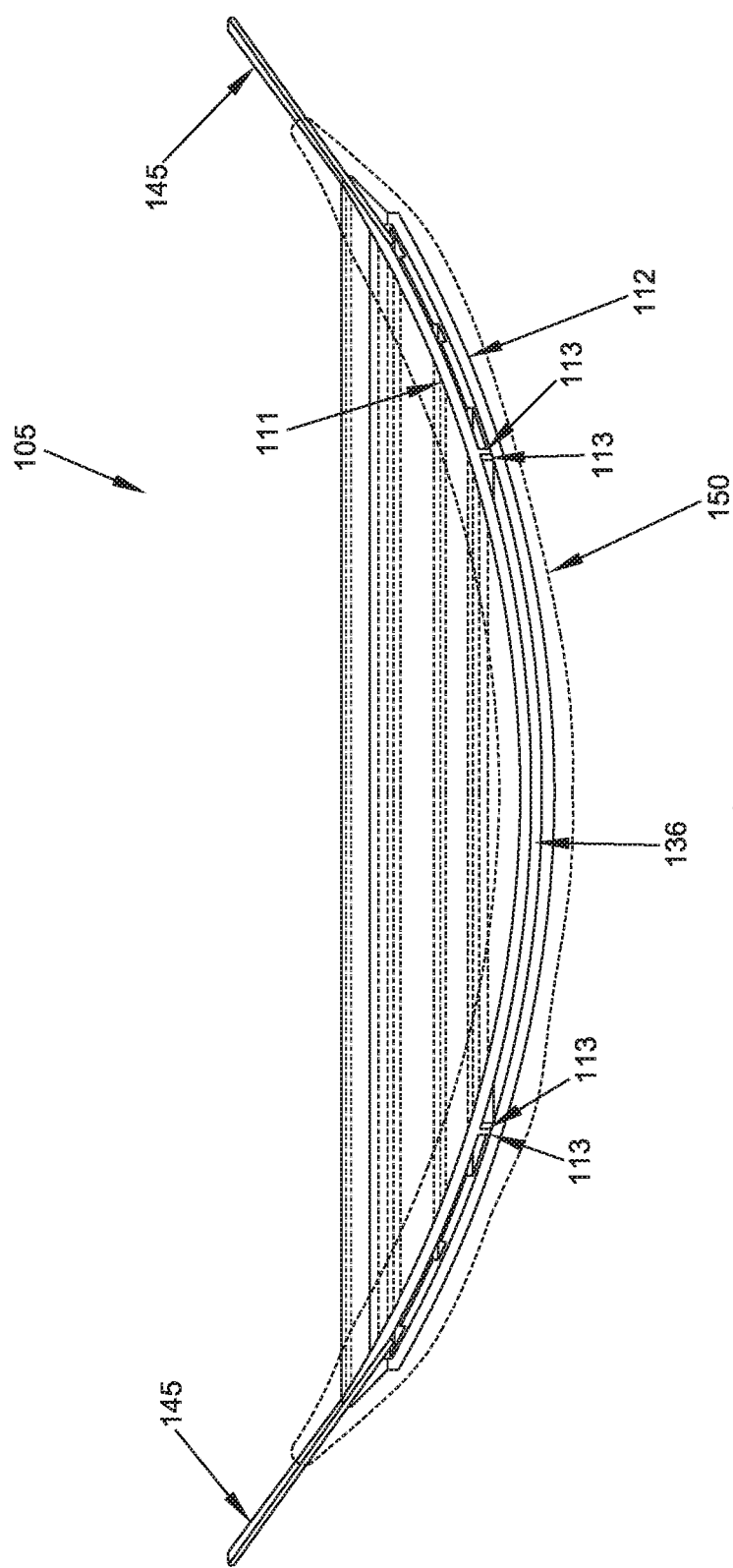
FIG. 4 is a schematic sectional view taken along line 4-4 of FIG. 3.
Figure 5:
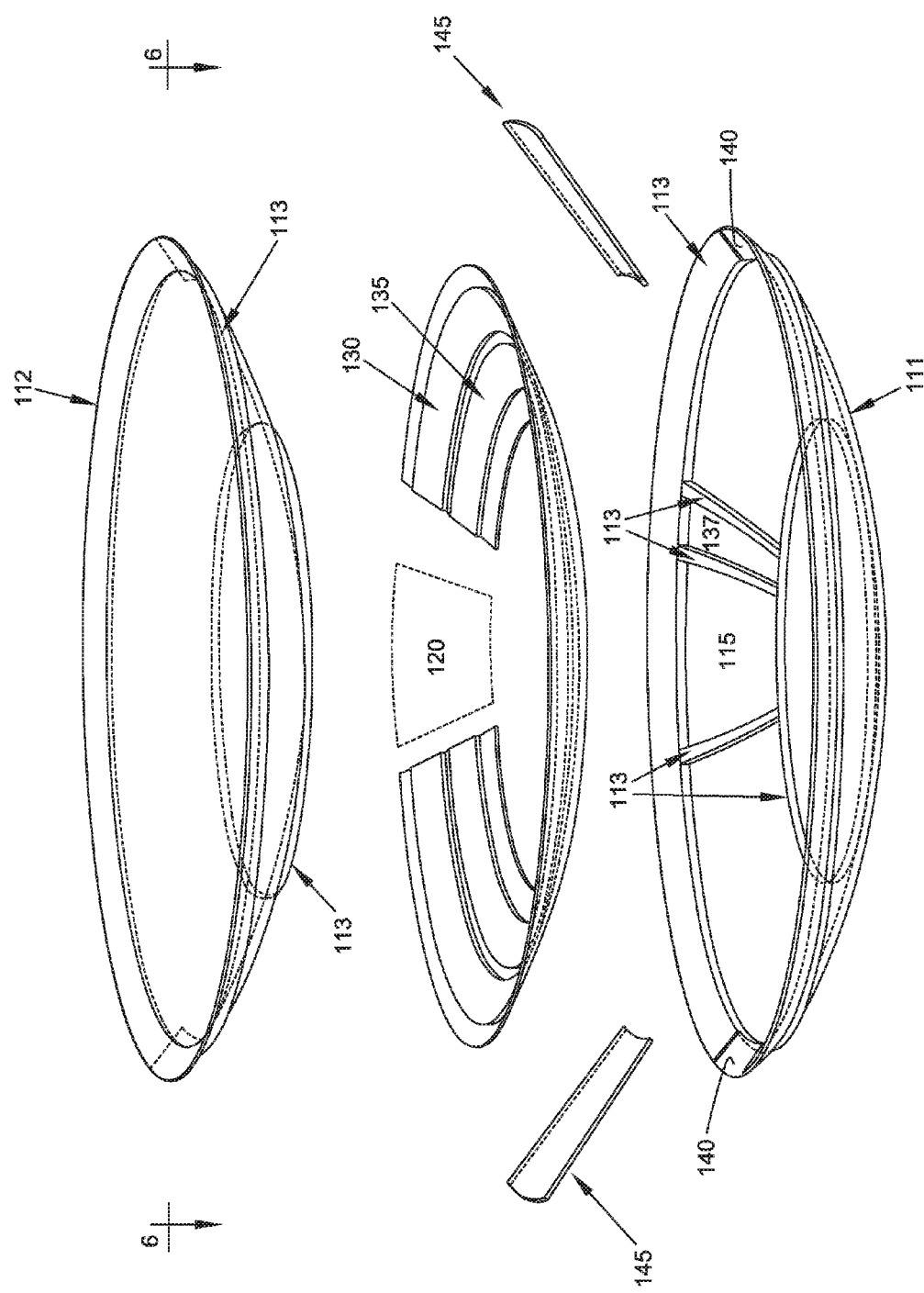
FIG. 5 is a schematic view of the smart contact lens of FIG. 3.
Figure 6:
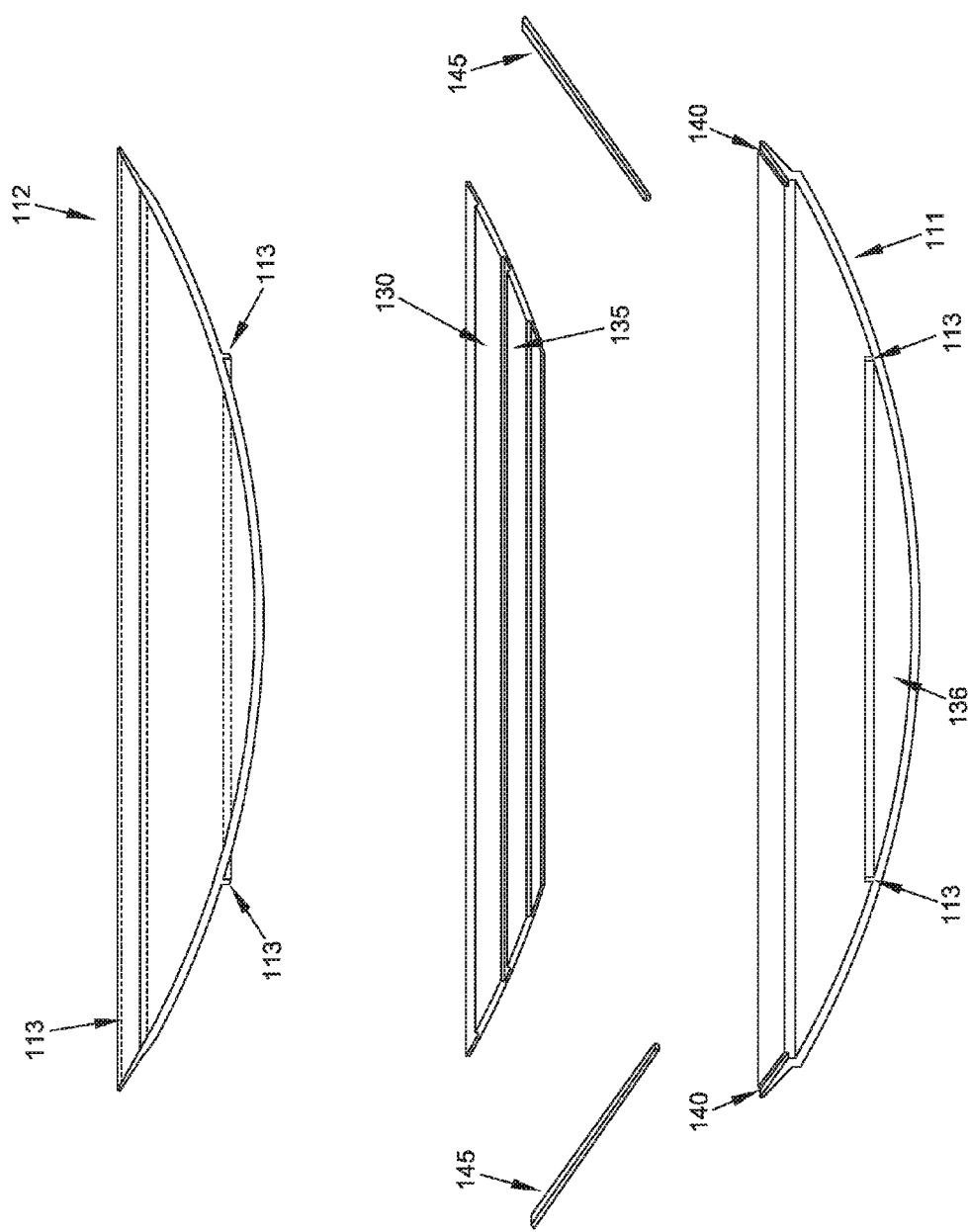
FIG. 6 is a schematic sectional view taken along line 6-6 of FIG. 5.
Figure 7:
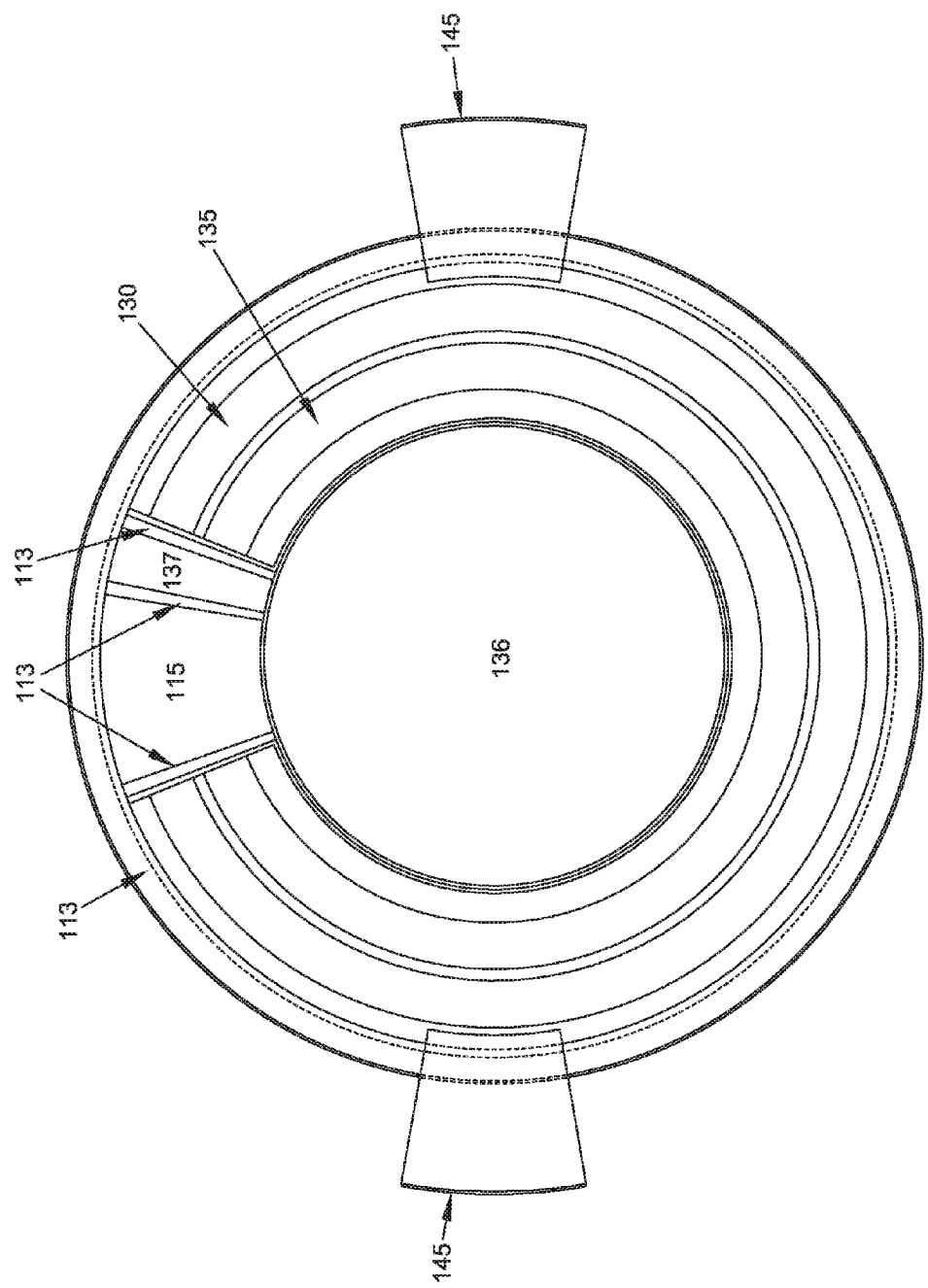
FIG. 7 is a schematic view of the smart contact lens of FIG. 3 with the back optic removed.
Figure 8:
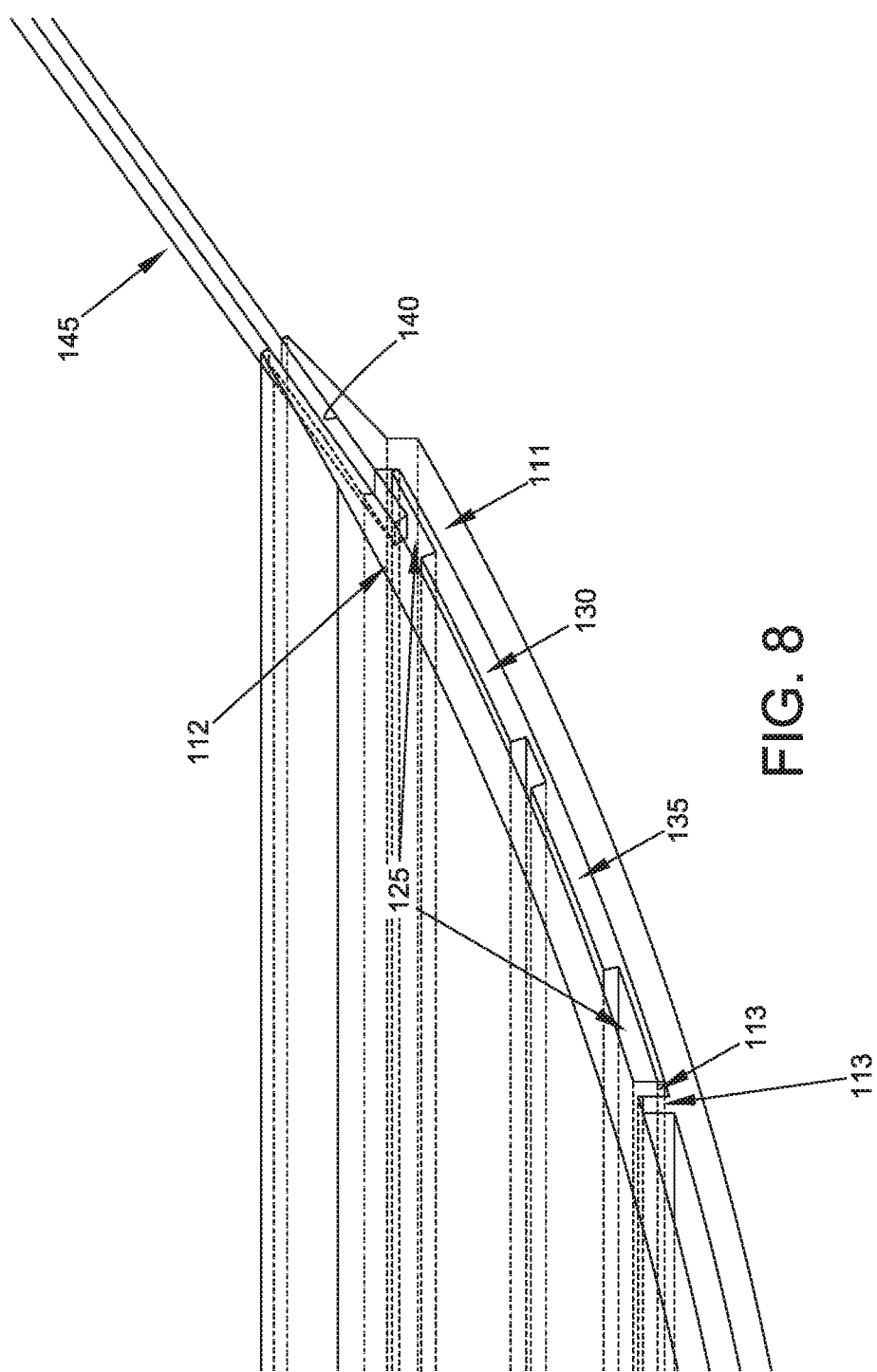
FIG. 8 is a schematic sectional view showing selected portions of the smart contact lens.
Figure 9:
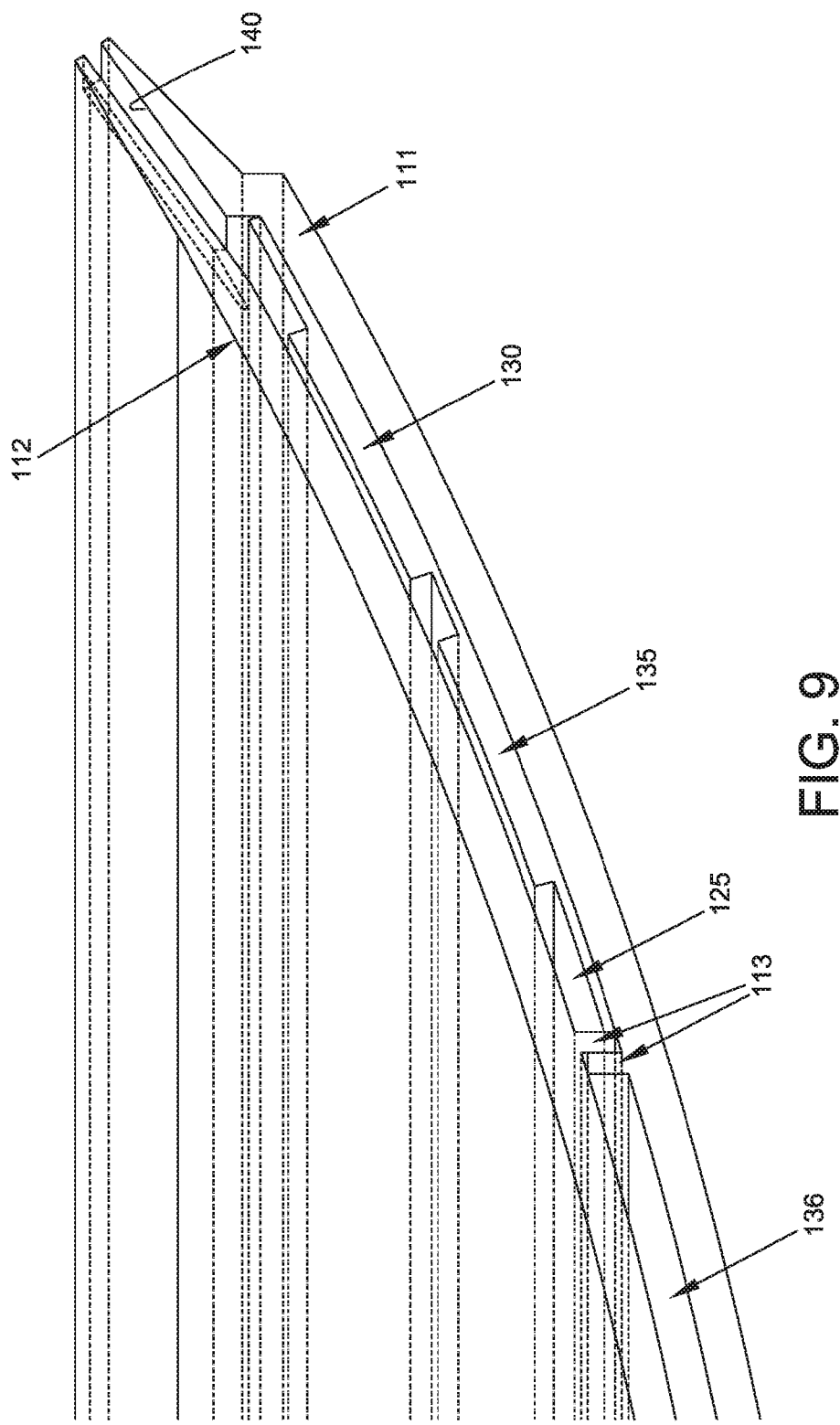
FIG. 9 is a schematic sectional view showing selected portions of the smart contact lens.

Looking next at FIG. 2A, the present invention comprises the provision and use of a novel biocompatible electronic device 5 (e.g., an LOC, a smart contact lens, etc.) that comprises a housing 10 having a sealed control electronics chamber 15 for containing control electronics 20 for controlling the operation of biocompatible electronic device 5 (e.g, for controlling operation of a sensor 22), and a sealed electrode chamber 25 for containing the electrodes 30, 35 of a microbattery for powering control electronics 20 contained in sealed control electronics chamber 15. Electrodes 30, 35 may comprise any biocompatible material consistent with the present invention (e.g., Al—AgO, magnesium-silver chloride electrodes, magnesium-copper chloride electrodes, etc.), and are connected to control electronics 20 contained in sealed control electronics chamber 15. Sealed electrode chamber 25 has an access port 40 that is sealed by a removable tab 45, such that upon removal of removable tab 45, a contacting fluid (e.g., a biofluid, saline, etc.) can contact the electrodes and act as an electrolyte for activating the microbattery, whereby to enable the microbattery to power control electronics 20 for novel biocompatible electronic device 5.

In view of the foregoing construction, novel biocompatible electronic device 5 can be stored in an uncontrolled environment for extended periods of time and remain sealed. At the time of use, removable tab 45 is removed from its position of sealing access port 40 so as to allow a contacting liquid (e.g., a biofluid, saline, etc.) to enter sealed electrode chamber 25, contact microbattery electrodes 30, 35 and activate the microbattery, whereby to power control electronics 20 contained in sealed control electronics chamber 15.

It will be appreciated that housing 10, sealed electrode chamber 25, biocompatible electrodes 30, 35 contained within sealed electrode chamber 25, access port 40 and removable tab 45 together form a biocompatible microbattery 50 for powering biocompatible electronic device 5.

If desired, novel biocompatible electronic device 5 may comprise a plurality of access ports 40, selectively sealed by one or more removable tabs 45.

If desired, and looking now at FIGS. 3-9, novel biocompatible electronic device 5 may comprise a smart contact lens 105. In this form of the invention, smart contact lens 105 may comprise a housing 110 formed by a front optic 111 and a back optic 112. Front optic 111 and back optic 112 comprise appropriate sealing elements (e.g., surfaces) 113 to together define housing 110 having a sealed control electronics chamber 115 for containing control electronics 120 for smart contact lens 105, and a sealed electrode chamber 125 for containing the electrodes 130, 135 (e.g. anode 130 and cathode 135) of a microbattery for powering control electronics 120 contained in sealed control electronics chamber 115. Front optic 111, back optic 112 and sealing elements (e.g., surfaces) 113 also cooperate to define an optical chamber 136 for containing an activatable liquid (e.g., a liquid crystal) for modifying the optical characteristics of smart contact lens 105. If desired, front optic 111, back optic 112 and sealing elements (e.g., surfaces) 113 may also cooperate with one another to define an overflow chamber 137 for receiving any overflow of activatable material (e.g., a liquid crystal) from optical chamber 136. Electrodes 130, 135 may comprise any biocompatible materials consistent with the present invention (e.g., Al—AgO, magnesium-silver chloride, magnesium-copper chloride, etc.), and are connected to control electronics 120 contained in sealed control electronics chamber 115. Sealed electrode chamber 125 comprises an access port 140 that is sealed by a removable tab 145, such that upon removal of removable tab 145, a contacting fluid (e.g., a biofluid, saline, etc.) can contact the electrodes and act as an electrolyte for activating the microbattery, whereby to enable the microbattery to power control electronics 120 for novel biocompatible electronic device 105.

In one preferred from of the invention, front optic 111 and back optic 112 can be injection molded or cast from optically clear plastic materials.

And in one preferred form of the invention, the microbattery may be a composite structure comprising a silicon substate having an appropriate anode material (e.g., aluminum, magnesium, etc.) screen printed in one pattern and an appropriate cathode material (e.g., silver oxide, silver chloride, copper chloride, etc.) screen printed in a second pattern, each pattern being disposed relative to one another so as to maximize the exposed surface area. Other techniques such as photomasked etching, sputtering, and 3-D printing may also be used to form the electrodes 130, 135 for the microbattery.

Control electronics 120 (e.g., switching circuitry) may comprise a flexible film layer with printed micro-logic electronic circuit and power components which switch logic states to advantageously control the movement of fluids, sensors, or the like within the device so as to effect a positive outcome of the change in state. By way of example but not limitation, in the case of smart contact lens 105, control electronics 120 control the state of the activatable material (e.g., a liquid crystal) contained within optical chamber 136.

If desired, smart contact lens 105 may comprise a plurality of access ports 140, selectively sealed by one or more removable tabs 145.

Removable tab(s) 145 is/are sized to precisely fit into access port(s) 140 so as to render the access port watertight. The material(s) used to form removable tab(s) 145 is/are selected so as to be resistant to the UV adhesives which are preferably used to seal the other chambers of the lens sub-assembly (e.g., control electronics chamber 115, electrode chamber 125, optical chamber 136 and overflow chamber 137). By way of example but not limitation, removable tab(s) 145 may be formed out of Delrin, Teflon, silicone, etc.

Before assembly, front optic 111 is positioned in a UV-transparent, polypropylene alignment fixture to receive electrodes 130, 135 of the microbattery and to seal control electronics 120 into what will become sealed electrode chamber 125 and sealed control electronics chamber 115, respectively. The electrical interconnection between the microbattery electrodes 130, 135, control electronics 120 and optical chamber 136 can be done before or after insertion into their respective cavities. Optical chamber 136 is then dosed with a precise amount of an appropriate activatable material (e.g., a liquid crystal, certain oil-water emulsions, etc). Any extra activatable material beyond that which is required to fill optical chamber 136 is forced into overflow chamber 137. The removable tab(s) 145 is/are positioned in the access port(s) 140 of front optic 111 and a UV curable adhesive is micro-dispensed onto sealing elements (e.g., surfaces) 113.

Back optic 112 is then precisely positioned onto front optic 111 and compressed slightly to disperse the UV curable adhesive. The lens subassembly is then exposed to UV light to cure the UV curable adhesive and seal the various chambers.

The sealed lens subassembly is then positioned between the A-side and B-side of an encapsulation mold where hydrogel 150 is injected into the space around the lens sub-assembly. After curing of the hydrogel, the completed smart contact lens is then removed from the mold and packaged in a saline-rich, sealed container. The integrity of the sealed surfaces of smart contact lens 105 is sufficient to maintain a moisture-free environment for the shelf-life of the smart contact lens device.

At the time of use, smart contact lens 105 is removed from the package, the removable tab(s) 145 are unseated and removed, and the smart contact lens is inserted into the eye of the user in the same manner as a conventional contact lenses. The tear layer of the eye surrounds the smart contact lens and is wicked into the microbattery's electrode chamber 125 which energizes control electronics 120 to await the user stimulus to switch states of the activatable material (e.g., a liquid crystal) within optical chamber 136. The microbattery is designed to power smart contact lens 105 until the end of a normal working day when the smart contact lens is discarded.

Modifications of the Preferred Embodiments

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. A contact lens comprising a biocompatible electronic device incorporating a point-of-use-activated microbattery, the biocompatible electronic device comprising:
    a housing;
    a sealed control electronics chamber formed within the housing;
    control electronics contained within the sealed control electronics chamber for controlling the operation of the biocompatible electronic device;
    a sealed electrode chamber formed within the housing; a plurality of electrodes contained within the sealed electrode chamber and connected to the control electronics;
    an access port formed within the housing for providing fluid access to the interior of the sealed electrode chamber; and
    a removable tab for selectively sealing the access port;
    such that, upon removal of the removable tab, a contacting fluid can contact the electrodes and act as an electrolyte for activating the microbattery, whereby to enable the microbattery to power the control electronics for the biocompatible electronic device.

2. The contact lens according to claim 1 wherein the control electronics control at least one of the operation of sensors, the movement of fluids and the state of an activatable material.

3. The contact lens according to claim 2 where in the activatable material comprises a liquid crystal.

4. The contact lens according to claim 1 wherein the plurality of electrodes comprise a biocompatible material.

5. The contact lens according to claim 4 wherein the plurality of electrodes comprise an anode and a cathode.

6. The contact lens according to claim 5 wherein the anode is formed out of a material selected from the group consisting of aluminum and magnesium and the cathode is formed out of a material selected from the group consisting of silver oxide, silver chloride and copper chloride.

7. The contact lens according to claim 5 wherein the plurality of electrodes comprise a silicon substrate having an anode material deposited on the silicon substrate in a first pattern and a cathode material deposited on the silicon substrate in a second pattern.

8. The contact lens according to claim 1 wherein the biocompatible electronics device comprises a plurality of access ports.

9. The contact lens according to claim 8 wherein the biocompatible electronics device comprises a plurality of removable tabs.

10. The contact lens according to claim 1 wherein the removable tab comprises tape.

11. The contact lens according to claim 1 wherein the removable tab comprises an elastomer.

12. The contact lens according to claim 1 wherein the contacting fluid comprises at least one from the group consisting of a biofluid and saline.

13. The contact lens according to claim 1 wherein the biocompatible electronic device 20 comprises an LOC.

14. The contact lens according to claim 1 wherein the biocompatible electronic device comprises a smart contact lens.

15. The contact lens according to claim 14 further comprising an optical chamber formed within the housing.

16. The contact lens according to claim 15 wherein the optical chamber contains an activatable material.

17. The contact lens according to claim 16 wherein the activatable material comprises a liquid crystal.

18. The contact lens according to claim 15 further comprising an overflow chamber connected to the optical chamber.

19. The contact lens according to claim 14 wherein the housing comprises a front optic and a back optic secured to one another so as to form a singular structure.

20. A method for operating a contact lens comprising a biocompatible electronic device, the method comprising:
    providing a biocompatible electronic device incorporating a point-of-use-activated microbattery, the biocompatible electronic device comprising:
    a housing;
    a sealed control electronics chamber formed within the housing;
    control electronics contained within the sealed control electronics chamber for controlling the operation of the biocompatible electronic device;
    a sealed electrode chamber formed within the housing; a plurality of electrodes contained within the sealed electrode chamber and connected to the control electronics;
    an access port formed within the housing for providing fluid access to the interior of the sealed electrode chamber; and
    a removable tab for selectively sealing the access port;
    such that, upon removal of the removable tab, a contacting fluid can contact the electrodes and act as an electrolyte for activating the microbattery, whereby to enable the microbattery to power the control electronics for the biocompatible electronic device; removing the removable tab and exposing the access port to a contacting fluid.

21. The method according to claim 20 wherein the removable tab is removed before exposing the access port to a contacting fluid.

22. The method according to claim 20 wherein the removable tab is removed after exposing the access port to a contacting fluid.

23. A contact lens comprising a point-of-use-activated microbattery, the point-of-use-activated microbattery comprising:
    a housing;
    a sealed electrode chamber formed within the housing;
    a plurality of biocompatible electrodes contained within the sealed electrode chamber;
    an access port formed within the housing for providing fluid access to the interior of the sealed electrode chamber; and
    a removable tab for selectively sealing the access port;

such that, upon removal of the removable tab, a contacting fluid can contact the biocompatible electrodes and act as an electrolyte for activating the microbattery.

24. A method for operating a contact lens comprising a point-of-use-activated microbattery, the method comprising:
providing a point-of-use-activated microbattery, the point-of-use-activated microbattery comprising:
a housing;
a sealed electrode chamber formed within the housing;
a plurality of biocompatible electrodes contained within the sealed electrode chamber;
an access port formed within the housing for providing fluid access to the interior of the sealed electrode chamber; and
a removable tab for selectively sealing the access port;
such that, upon removal of the removable tab, a contacting fluid can contact the biocompatible electrodes and act as an electrolyte for activating the microbattery; and
removing the removable tab and exposing the access port to a contacting fluid, wherein the contacting fluid contacts the biocompatible electrodes and acts as an electrolyte for activating the microbattery.

\* \* \* \* \*